No. 889,674. PATENTED JUNE 2, 1908.
W. FRASER.
ADVERTISING DEVICE.
APPLICATION FILED AUG. 15, 1906. RENEWED NOV. 25, 1907.
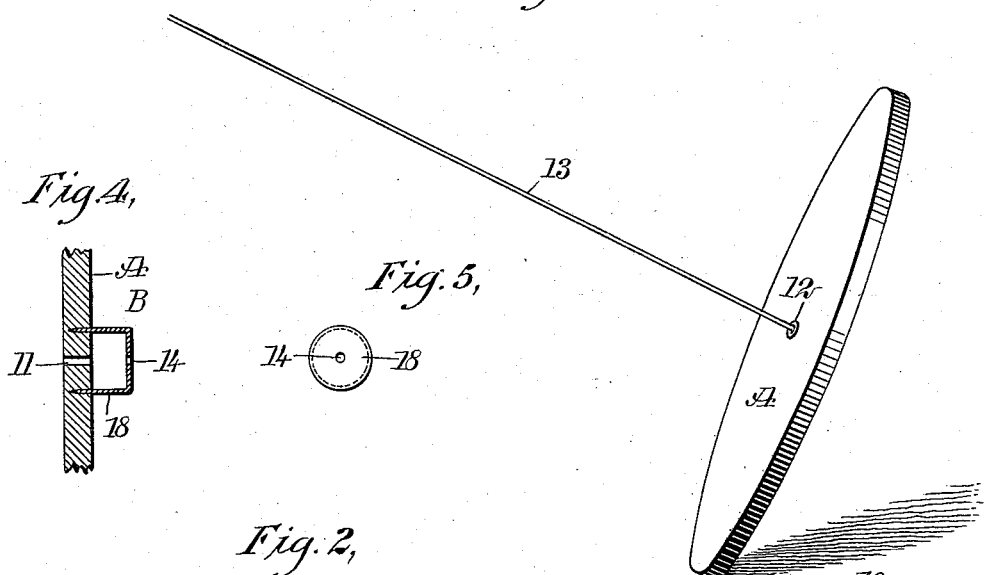
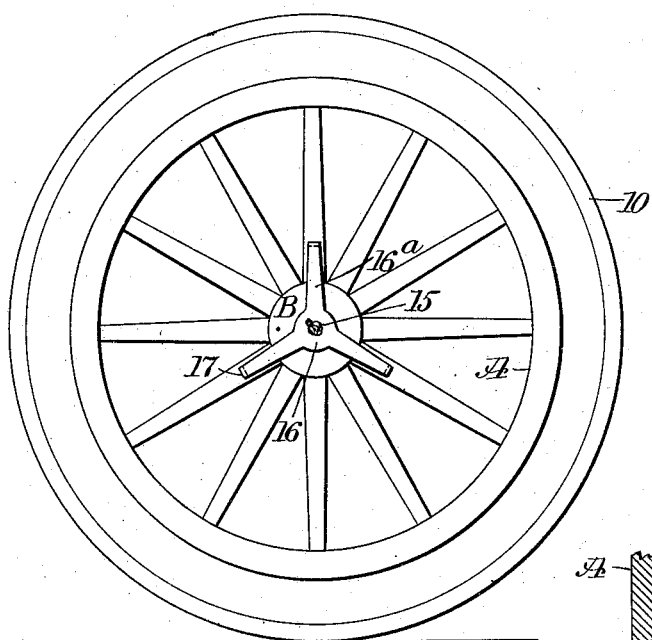
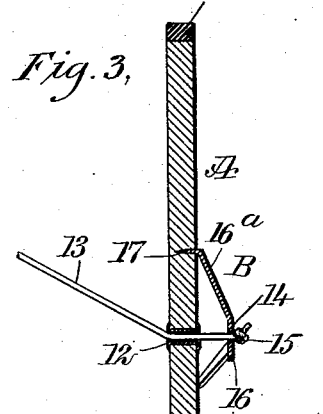
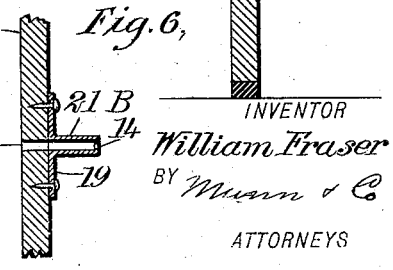
INVENTOR
William Fraser
BY
ATTORNEYS

UNITED STATES PATENT OFFICE.

WILLIAM FRASER, OF ESCANABA, MICHIGAN.

ADVERTISING DEVICE.

No. 889,674.   Specification of Letters Patent.   Patented June 2, 1908.

Application filed August 15, 1906, Serial No. 330,659. Renewed November 25, 1907. Serial No. 403,695.

*To all whom it may concern:*

Be it known that I, WILLIAM FRASER, a citizen of the United States, and a resident of Escanaba, in the county of Delta and State of Michigan, have invented a new and Improved Advertising Device, of which the following is a full, clear, and exact description.

The purpose of the invention is to provide an advertising device in the form of an amusing toy wheel or disk, and means whereby through the medium of an attached cord said wheel or disk can unfailingly be made to travel upon its edge with greater or less velocity to attract attention to and conspicuously display advertisements produced thereon.

A further purpose of the invention is to provide a device of the character described which will be simple, durable and inexpensive, and one that is particularly well adapted for advertising purposes.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a perspective view of the improved device in action; Fig. 2 is a side elevation thereof; Fig. 3 is a central section through another form of the device; Fig. 4 is a section through a portion of the disk and one form of the retainer for the cord; Fig. 5 is a face view of the retainer shown in Fig. 4; Fig. 6 is a view similar to that shown in Fig. 4, but illustrating the application of another form of retainer for the cord; and Fig. 7 is a face view of the retainer shown in Fig. 6.

A represents a rolling object which may be in the form of a disk as shown in Fig. 1, or in the form of a wheel as illustrated in Fig. 2, and said disk or wheel is sometimes provided with a tire 10 of metal, felt, rubber or the like, or the tire may be omitted if desired. The said wheel or disk A is further provided with a central opening 11, and said opening is generally protected and rendered smooth by the application of an eyelet 12.

A retainer B for a cord 13 is applied to the central portion of the disk or wheel at its outer face, and said retainer B is of such shape that it will project out from the disk or wheel at its central portion and at such point be parallel with the outer face of said disk or wheel. This central projecting portion of the retainer is provided with an aperture 14, which aperture is in horizontal or axial alinement with the central opening 11 in said disk or wheel. The cord 13, after having been passed through the opening 12 in the disk or wheel is passed through the aperture 14 in the retainer B, and is knotted or has an enlargement formed thereon as is shown at 15 in the drawings. Thus the outer end of the cord being removed from the disk but in axial alinement therewith, when the other end of the cord is held in the hand the outer stretch of the cord acts approximately as a lever and forces the disk or wheel to lean outwardly as shown in Fig. 1; and when the person holding the cord walks or runs the object is forced to roll upon the surface supporting it and will not tend to fall flat thereon.

It will be observed that by the peculiar arrangement of the retainer, the axis of the disk is extended in a direction opposite to the direction of traction on the cord, and an extended bearing is formed. That part of the cord inclosed in the bearing is the axis upon which the disk rotates, and traction upon the cord tends to put the main portion of the cord in alinement with its axial portion whereby to offer the least resistance to the rotation of the disk. The faces of the wheel or disk may be decorated or may have advertising matter produced thereon.

Different forms of retainers B may be employed with equally good results, as is shown in the drawings, but each one must be constructed on the lines heretofore mentioned. Thus in the form of retainer shown in Figs. 2 and 3 a central section 16 is provided, which is parallel with the outer face of the wheel or disk and is removed some distance therefrom; and the aperture 14 for the cord is in this section 16 in alinement with the opening 11 in the disk, and legs $16^a$ are carried from this central section 16 inward to an engagement with the outer face of the disk and are secured thereto by spurs 17. Thus the retainer shown in Figs. 2 and 3 is of spider-like construction.

In Figs. 4 and 5 the retainer therein shown is in the form of a cylindrical nipple, the aperture 14 for the passage of the cord being at the central portion of its outer face, and the inner edge of this nipple is sharpened so as to be driven into the outer face of the disk or wheel, occupying such position that the aforesaid aperture or opening 14 for the passage of the cord is in horizontal alinement with the opening 11 in the disk or wheel.

In Figs. 6 and 7 another form of retainer is shown, in which a disk flange 19 is provided with a series of apertures 20, adapted to receive nails or the like to secure the flange to the outer face of the wheel, and said flange is provided with an opening which is surrounded by an outwardly-extending tubular post 21, and in the outer end of this post an aperture 14 is produced for the outward passage of a cord, which aperture is in alinement with the longitudinal central portion of the opening 11 in the disk or wheel.

This device offers ample space for an elaborate display of advertising matter, and furthermore by its use such advertisements are brought before the public in a novel and extremely effective manner by the aid of children.

Having thus described my invention, I claim as new, and desire to secure by Letters Patent,—

1. As an improved article of manufacture, an advertising device consisting of a disk or wheel having a central opening therein, a retainer secured to the outer face of the disk or wheel, having that portion which is opposite the opening in the disk or wheel outwardly-removed therefrom and provided with an aperture in horizontal alinement with the opening in said disk or wheel, and a cord passed from the inside of the disk or wheel through the opening therein and the aperture in the retainer, said cord being provided with an enlargement at its outer end.

2. As an improved article of manufacture, an advertising device consisting of a disk or wheel provided with a central opening, a cord passed from the inside out through the said opening, having its outer end enlarged, and a retaining device extending from the outer face of the wheel or disk, which retaining device holds the outer stretch of cord in axial alinement with said wheel or disk.

3. As an improved article of manufacture, an advertising device consisting of a wheel or disk having a central opening therein, a retaining device secured to the outer face of the wheel or hub around its opening, the central portion of the retaining device being removed some distance from the outer face of the wheel and provided with an aperture in horizontal alinement with the central portion of the opening in the disk or wheel, and a cord having one end free and the other end passed from the inside of the disk or wheel through the opening therein and through the aperture in the said retaining device, the outer end of the said cord having an enlargement which bears upon the said retaining device for the purposes described.

4. As an improved article of manufacture, an advertising device, consisting of a disk or wheel having a central opening forming a bearing and a cord extending through the bearing, the bearing of the disk being extended in a direction opposite to the direction of the tractive force exerted upon the cord, said cord having an enlargement beyond said bearing whereby to retain it in position.

In testimony whereof I have signed my name to this specification in the presence of two subscribing witnesses.

WILLIAM FRASER.

Witnesses:
  MICHAEL DOHERTY.
  FRANK W. LEWIS.